United States Patent
Mitsuoka et al.

(10) Patent No.: US 7,356,481 B2
(45) Date of Patent: Apr. 8, 2008

(54) DELIVERY MANAGEMENT METHOD AND DEVICE, AND DELIVERY INFORMATION SERVICE METHOD

(75) Inventors: Madoka Mitsuoka, Kawasaki (JP); Youji Kohda, Kawasaki (JP); Masashi Uyama, Kawasaki (JP); Noboru Iwayama, Kawasaki (JP); Yuji Kijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 09/769,533

(22) Filed: Jan. 26, 2001

(65) Prior Publication Data

US 2002/0016744 A1 Feb. 7, 2002

(30) Foreign Application Priority Data

Jul. 31, 2000 (JP) .............................. 2000-231135

(51) Int. Cl.
G06Q 30/00 (2006.01)
(52) U.S. Cl. ............................................ 705/8; 705/26
(58) Field of Classification Search .................. 705/1, 705/7, 8, 26
See application file for complete search history.

(56) References Cited

U.S. PATENT DOCUMENTS

| | | | | |
|---|---|---|---|---|
| 5,576,951 A | * | 11/1996 | Lockwood ..................... | 705/27 |
| 5,648,770 A | * | 7/1997 | Ross .......................... | 340/994 |
| 5,694,551 A | * | 12/1997 | Doyle et al. .................. | 705/26 |
| 5,732,400 A | * | 3/1998 | Mandler et al. .............. | 705/26 |
| 5,758,126 A | * | 5/1998 | Daniels et al. ............... | 715/780 |
| 5,862,223 A | * | 1/1999 | Walker et al. ................ | 705/50 |
| 5,960,411 A | * | 9/1999 | Hartman et al. .............. | 705/26 |
| 6,085,170 A | * | 7/2000 | Tsukuda ....................... | 705/26 |
| 6,304,856 B1 | * | 10/2001 | Soga et al. .................... | 705/28 |
| 6,978,929 B2 | * | 12/2005 | Buie et al. .................... | 235/382 |
| 7,197,465 B1 | * | 3/2007 | Hu et al. ...................... | 705/1 |
| 7,257,552 B1 | * | 8/2007 | Franco ......................... | 705/28 |

(Continued)

FOREIGN PATENT DOCUMENTS

JP 4106657 A * 4/1992

(Continued)

OTHER PUBLICATIONS

Anon., "American Freightways Announces Latest Web-Site Enhancements," PR Newswire, May 24, 1999.*

(Continued)

*Primary Examiner*—Nicholas D. Rosen
(74) *Attorney, Agent, or Firm*—Staas & Halsey LLP

(57) ABSTRACT

Method for making delivery of products more efficient, and having deliveries made that are convenient for delivery recipients. When a user (delivery recipient 3) purchases a product from a vendor and applies for delivery, a management server 4 accepts a delivery application from a vendor client 1. The management server 4 notifies the delivery recipient client 3 of the application for delivery, and prompts the user to designate delivery terms. For example, a delivery terms designation form is provided on a web page, and the URL for that web page is provided in the application for delivery notification. The delivery recipient client 3 accesses the web page and refers to a list of products to be delivered to him or herself. Moreover, the delivery recipient designates delivery terms when he or she is certain of his or her schedule. A delivery business is notified of these delivery terms.

9 Claims, 23 Drawing Sheets

U.S. PATENT DOCUMENTS

| | | | |
|---|---|---|---|
| 2002/0007299 A1* | 1/2002 | Florence ........................ | 705/9 |
| 2002/0032613 A1* | 3/2002 | Buettgenbach et al. ....... | 705/26 |
| 2002/0035515 A1* | 3/2002 | Moreno ........................ | 705/26 |
| 2002/0046153 A1* | 4/2002 | Piggins ........................ | 705/37 |
| 2004/0039712 A1* | 2/2004 | Tartal et al. ................. | 705/404 |
| 2005/0038758 A1* | 2/2005 | Hilbush et al. ............. | 705/402 |
| 2005/0171862 A1* | 8/2005 | Duncan ........................ | 705/26 |
| 2007/0061222 A1* | 3/2007 | Allocca et al. ............... | 705/26 |
| 2007/0073551 A1* | 3/2007 | Williams et al. ............... | 705/1 |
| 2007/0233507 A1* | 10/2007 | Publicover ..................... | 705/1 |

FOREIGN PATENT DOCUMENTS

| | | | |
|---|---|---|---|
| JP | 05165847 | | 7/1993 |
| JP | 06-141100 | | 5/1994 |
| JP | 08287158 | | 11/1996 |
| JP | 10162065 | | 6/1998 |
| JP | 10269447 | | 10/1998 |
| JP | 11272752 A | * | 10/1999 |
| JP | 2000-163480 | | 6/2000 |
| WO | WO-9427264 A1 | * | 11/1994 |

OTHER PUBLICATIONS

Anon., "Post Office Pitches for Internet Shoppers," Guardian, Nov. 27, 1999.*

Anon., "Shipping and Freight Forwarding Information Accessible Online," HK Economic Times, Apr. 7, 2000.*

Anon., "Nextel Introduces Nextel Online(SM): Wireless Internet Service for Business," PR Newswire, Apr. 25, 2000.*

Knill, B., "Crossdocking Gets Smarter," Material Handling Management, vol. 55, No. 6, pp. 91-95, Jun. 2000.*

Anon., "SmartShip.com Announces Multi-Carrier Shipping and Tracking Function for E-Commerce," Business Wire, Apr. 3, 2000.*

U.S. Appl. No. 60/212,596.*

U.S. Appl. No. 60/220,289.*

U.S. Appl. No. 60/255,407.*

U.S. Appl. No. 60/197,499.*

U.S. Appl. No. 60/218,400.*

Bjorner, S.N., "Shop Online for Holiday Food," Link-Up, vol. 9, No. 6, pp. 14, Nov./Dec. 1992.*

Anon., "Webvan.com Debuts as Online Grocery and Drug Megastore in the San Francisco Bay Area," Business Wire, p. 0282, Jun. 2, 1999.*

Anon., "College Takeout Online," The Food Institute Report, vol. 72, Aug. 16, 1999.*

Anon., "Omaha, Neb.-Based Start-Up Firm to Offer Online Grocery Service," Omaha World-Herald, Jan. 17, 2000.*

Anon., "Service," Air Cargo Report, vol. 4, No. 24, Dec. 4, 1997.*

Anon., "Post Office Pitches for Internet Shoppers," Guardian, p. 29, Nov. 27, 1999.*

Kunii, I.M., "A Trucker for the Information Highway: Yamato Is Emerging as the Premier Delivery Service for Japan's Growing E-Mart," Business Week, No. 3658, p. EB42, Dec. 13, 1999.*

Anon., "Parcelforce: Making E-Commerce Deliver," New Media Age, Mar. 23, 2000.*

Batchelor, C., "Survey—The Queens Award for Enterprise: Technology Helps Speed Delivery," Financial Times, Surveys, p. 3, Apr. 22, 2000.*

* cited by examiner

| Delivery Recipient ID | Requester ID | Vendor | Product for Delivery | Delivery Date | Delivery Place | Delivery Business | Application ID | Stock Conditions | Delivery Conditions |
|---|---|---|---|---|---|---|---|---|---|
| KXD01234 | KXD01234 | Orange Denka | Refrigerator | | | | 353198 | In Stock | Delivery Pending |
| | KXX78910 | Nakamura Department Store | Ham Assortment | | | | 489036 | Not In Stock | Delivery Pending |
| KCA83456 | KCA83456 | Chasco | Desk | 2000/03/29 | Home | | 871123 | In Stock | Delivery in Progress |
| | KCA83456 | Big Camera | Video Deck | | | Teriyaki Delivery | 885729 | In Stock | Delivery Pending |

*Fig. 2*

| User ID | Name | Delivery Place | Address | Email Address | Phone No. |
|---|---|---|---|---|---|
| KXD01234 | Madoka Mitsuoka | Home | 1398-2 Tohru Fuji Nishiakashi Heights, Akashi-shi, Toba | mitsu@nifty.com | 078-123-4567 |
| | | Parents' Home | 3-14-2 Seinan, Niiza, Saitama Prefecture | | 048-123-4567 |
| KCA83456 | Yoji Kanda | Home | Tohru Fuji Goshikiyama Heights, Goshikiyama, Tarumi-ku, Kobe | kouda@nifty.com | 078-087-4531 |

*Fig. 3*

| Delivery Recipient ID | Requester ID | Vendor | Product for Delivery | Application ID |
|---|---|---|---|---|
| KXD01234 | KXD01234 | Orange Denka | Washing Machine | 357432 |

Input of Delivery Request

Vendor: Orange Denka
Delivery recipient ID: [____]
Requester ID: [____]
Product for Delivery: [____]
Application ID: 3567432

*Fig. 9*

| From: delivery@nifty.com |
|---|
| To: mitsu@nifty.com |
| Dear Madoka Mitsuoka<br><br>The following delivery request has arrived from Orange Denka:<br><br>Application ID: 35676432, washing machine<br><br>Please access http://delivery.nifty.com/id=kxd01234 and designate delivery time and date, place and delivery business |

*Fig. 10*

List of Products for Delivery to Ms. Mitsuoka

| Requester | Vendor | Product for Delivery | Delivery Date | Delivery Place | Delivery Business | Application ID | Stock condition | Delivery conditions |
|---|---|---|---|---|---|---|---|---|
| Madoka Mitsuoka | Orange Denka | Washing Machine | | | | 357432 | In stock | Delivery pending |
| Madoka Mitsuoka | Orange Denka | Refrigerator | | | | 353198 | In stock | Delivery pending |
| Tohru Fuji | Nakamura Department Store | Ham Assortment | | | | 489036 | In stock | Delivery pending |

[ Decided ]

Fig. 11

List of Products for Delivery to Ms. Mitsuoka

| Requester | Vendor | Product for Delivery | Delivery Date | Delivery Place | Delivery Business | Application ID | Stock condition | Delivery conditions |
|---|---|---|---|---|---|---|---|---|
| Madoka Mitsuoka | Orange Denka | Washing Machine | 4/1/2000, a.m. | Home | Namako Transport | 357432 | In stock | Delivery pending |
| Madoka Mitsuoka | Orange Denka | Refrigerator | 4/1/2000, a.m. | Home | Namako Transport | 353198 | In stock | Delivery pending |
| Tohru Fuji | Nakamura Department Store | Ham Assortment | 4/1/2000, a.m. | Home | Namako Transport | 489036 | In stock | Delivery pending |

Decided

Fig. 12

| From: delivery@nifty.com |
|---|
| To: staff@namako.co.jp |
| To Namako Transport:<br><br>We request delivery of the following product:<br>Requester: Orange Denka, Nishiakashi Store<br>Delivery recipient: Ms. Madoka Mitsuoka<br>Address: 1398-2 Nishiaskaishi Heights, Toba, Akashi-shi<br>Phone No.: 078-123-4567<br>Product for delivery: Washing machine<br>Delivery date and time: 4/1/2000, a.m. |

*Fig. 13*

| Group | Delivery Recipient ID | Name | Address | Email Address | Phone No. |
|---|---|---|---|---|---|
| Fuji-3 | FJL98456 | Tohru Fuji | 1000-1 Toba, Akashi-shi | tohru@nifty.com | 078-345-4567 |
| Fuji -3 | FJL98457 | Tohko Fuji | 1000-1 Toba, Akashi-shi | tohko@nifty.com | 048-345-4567 |
| Fuji -3 | BOC30412 | Ken Fuji | 1000-1 Toba, Akashi-shi | ken @nifty.com | 090-0812-4531 |
| Mitsuoka-1 | KXD01234 | Madoka Mitsuoka | 1398-2 Toba, Akashi-shi | mitsu@nifty.com | 078-123-4567 |

List of Products to be Delivered to Mr. Fuji

| Delivery Recipient | Vendor | Product for Delivery | Delivery Date | Delivery Place | Delivery Business | Application ID |
|---|---|---|---|---|---|---|
| Tohru Fuji | Orange Denka | PC | | | | 357432 |
| Tohko Fuji | Hanshin Department Store | Sofa | 2000/04/01 | Home | Namako Transport | 353198 |
| Ken Fuji | CD-Future | CD | 2000/04/01 | Home | Namako Transport | 489036 |

Decided

*Fig. 17*

List of Products to be Delivered to Mr. Fuji

| Delivery Recipient | Vendor | Product for Delivery | Delivery Date | Delivery Place | Delivery Business | Application ID |
|---|---|---|---|---|---|---|
| Tohru Fuji | Orange Denka | PC | 2000/04/01 | Home | Namako Transport | 357432 |
| Tohko Fuji | Hanshin Department Store | Sofa | 2000/04/01 | Home | Namako Transport | 353198 |
| Ken Fuji | CD-Future | CD | 2000/04/01 | Home | Namako Transport | 489036 |

Decided

Fig. 18

Product Cancel Selection

Please Check the Product to be Cancelled

| Delivery Recipient | Vendor | Product for Delivery | Delivery Date | Delivery Place | Delivery Business | Application ID | Cancellation |
|---|---|---|---|---|---|---|---|
| Madoka Mitsuoka | Orange Denka | Washing Machine | | | | 357432 | x |
| Madoka Mitsuoka | Orange Denka | Refrigerator | | | | 353198 | |
| Tohru Fuji | Nakamura Department Store | Ham Assortment | | | | 489036 | x |

Decided

*Fig. 22*

| Delivery Recipient ID | Requester ID | Vendor | Product for Delivery | Application ID | Delivery Charge Payer |
|---|---|---|---|---|---|
| KXD01234 | LMF87645 | Nakamura Dept. Store | Ham Assortment | 489036 | Requester |

Input of Delivery Wish

Vendor: Orange Denka [        ]

Delivery Recipient ID

Requester ID: [        ]

Product for Delivery: [        ]

Payer of Charges: ☐ Delivery Recipient ☐ Requester

Application ID: 3567432

*Fig. 27*

List of products for delivery to Mr. Mitsuoka

| Requester | Vendor | Product for Delivery | Delivery Date | Delivery Place | Delivery Business | Application ID | Type of Service | Charges |
|---|---|---|---|---|---|---|---|---|
| Madoka Mitsuoka | Orange Denka | Washing Machine | 2000/4/1 AM | Home | Namako Transport | 357432 | Standard | 1500 Ynen |
| Madoka Mitsuoka | Orange Denka | Refrigerator | 2000/4/1 AM | Home | Namako Transport | 353198 | Standard | Included in Above |
| Tohru Fuji | Nakamura Department Store | Ham Assortment | 2000/4/1 AM | Home | Namako Transport / Belican Transport / Samoa Rush Transport | 489036 | Rush | 700 Ynen |

Decided

Total 1500 yen

Fig. 28

DELIVERY MANAGEMENT METHOD AND DEVICE, AND DELIVERY INFORMATION SERVICE METHOD

BACKGROUND OF THE INVENTION

1. Technical Field

The present invention relates to the delivery of purchased products. More specifically, it relates to the delivery of products purchased at stores, through mail order, and through online shopping.

2. Description of Related Art

In recent years it has become customary for products to be sold not just at stores, but through mail order and through online shopping over the Internet. With this growth in mail order and online shopping, there has been a corresponding increase in the delivery of products by delivery businesses to the purchasers and to parties who receive those products as gifts (hereinafter referred to collectively as "delivery recipient").

However, with such changes in society as more and more households comprising only the nuclear family, husband and wife both holding jobs, and more people living by themselves as they wait longer to get married, there has been an increasing number of instances where delivery cannot be made because the intended recipient is not at home. When the recipient is not at home, the delivery business has to attempt another delivery at a later time; the delivery recipient, seeing the notice that delivery was attempted, must request the delivery business to make another delivery, and must wait at home for that delivery. This imposes a burden both on the delivery business and the delivery recipient, and is a factor in rising delivery costs. For this reason, services have been proposed such that the party requesting delivery can specify delivery date and time, to make certain that delivery will be made when he or she is at home.

In addition, Japanese Laid-open Patent Application 10-162065 describes art wherein a home delivery business refers to recipient schedule information when determining the time and date for scheduling a delivery. Japanese Laid-open Patent Application 10-269447 describes art relating to home delivery of a purchased product. By using this technology, a purchaser can select at time of purchase of product his or her desired delivery service from among a plurality of possible delivery services.

Furthermore, Japanese Laid-open Patent Application 5-165847 describes art for building a not-at-home database and making it possible to predict when a delivery recipient will be at home based on this database. This not-at-home database is built when the delivery recipient/user comes home, finds that a delivery has been attempted, sees the attempted delivery notice that the delivery business left, calls the delivery business, and informs the delivery business of his or her desired date and time of delivery.

While the above-described background technology is effective to a certain degree, in that it increases the probability that the delivery will be made when the intended recipient is at home, it leaves the following problems unsolved.

First, when a single user has purchased products from a plurality of vendors, each vendor may use a different delivery business, and even if they do use the same delivery business the deliveries will still be made at different times. Thus, there are delivery charges for each product, meaning an increase in delivery costs. And, for example, because a plurality of delivery businesses will come to make delivery, a user will have to respond to each delivery, which is bothersome.

Second, even if a delivery date and time were specified when requesting delivery, there are times when a user will want to change that delivery date and time because, for example, of a change in plans. In such cases, even if the user tries to request a change over the phone, there may be times when he or she is unable to get through to the delivery business because, for example, the offices aren't open, or it is difficult to make the change, or the getting the change done requires much time and effort. For example, if a user plans to have a plurality of products delivered all on the same day off, he or she must get in touch with a plurality of delivery businesses. And when sending a gift to another person, asking that person beforehand when a good time for delivery is and then specifying a delivery date and time not only is bothersome, it also diminishes the pleasure of both giving and receiving the gift.

Third, if a user lives with someone else, he or she can have that other person receive that delivery in his or her place, but it is bothersome to have to ask fellow family members their plans each time one schedules a delivery. In the end this can lead to a situation where individual family members schedule deliveries on their own, and the overall trouble involved in being present to receive delivery increases.

Fourth, there are cases where in spite of the fact that a user paid for a product at the time that he or she ordered, because a vendor is out of stock for that item or is waiting for a shipment of that item, it takes a considerable time for that product to reach the user who made the order. The lag between the time of order and the time of receipt is a cause of frustration to the user who made the order.

SUMMARY OF THE INVENTION

It is an object of the present invention to resolve the above problems by allowing for efficient delivery, to alleviate the burden both to delivery recipients and to delivery businesses.

The present invention makes possible the consolidated processing of delivery information that conventionally has been processing independently for each vendor or product provider and each delivery business. This allows a user to enjoy the benefits of a service that allows him or her to know beforehand when a product will be delivered, and to designate how he or she will receive an article, in accordance with his or her convenience and preference. And this allows delivery businesses to enjoy a service that makes it possible to deliver at the same time products that have conventionally been delivered separately, despite the fact that they all had the same delivery recipient, leading to increased overall efficiency of the delivery business's delivery work.

Thus, in order to solve the above-described problems, the present invention provides a method for managing delivery of products that have been ordered, wherein:

A: an application for delivery of the product is received from a provider of the product;

B: an application ID is assigned to the application;

C: the delivery recipient of the product is notified of the application ID and is prompted to designate delivery terms;

D: the delivery recipient is presented with a list of products scheduled to be delivered to the delivery recipient and the application IDs therefor;

E: designation of delivery terms for the application specified by the application ID is accepted from the delivery recipient after order of the product; and F: request for delivery is made by notifying a predetermined delivery business of the products corresponding to application IDs for which the same delivery terms have been designated, of the designated delivery terms, and of the delivery recipient.

For example, let us consider a case where a user A makes an online purchase of a product Q from a company X and designates herself or himself as a recipient. Company X makes an application with a predetermined management server for delivery to user A. The management server, upon receiving this application, sends to user A an email with the URL of a web page with a form for inputting delivery terms, so that user A can designate those delivery terms.

When user A accesses that web page, a list of products scheduled to be delivered to him or her is displayed, and he or she can input the delivery terms for each product. Delivery terms herein are such matters as delivery date and time, delivery place, type of delivery service, delivery business, etc. This web page may also give notification of whether the product scheduled for delivery is in stock or not. This web page may also give notification of the state of delivery for products for which delivery terms have already been specified.

A delivery business is notified of the delivery terms, and the delivery business delivers the product to the delivery recipient in accordance with the delivery terms.

By using this method, a delivery recipient can designate whatever time is convenient for receipt of the package, and furthermore can receive a plurality of packages at the same time. Of course delivery terms can be changed from product to product. For a delivery business, because it can make combined delivery of products, this will lead to a reduction in costs and time spent. Furthermore, the party providing the management server can realize a profit. For example, a delivery business can have part of the cost reductions reflected in reduced delivery charges, and pay the remainder to the party providing the management server.

A second aspect of the present invention provides a delivery management method in accordance with the first-mentioned aspect. In the method, formation of a group and designation of group members is accepted from the delivery recipient, and when a delivery recipient is notified of the product and application ID, notification is also given of a list of products scheduled for delivery to other members of the group to which the delivery recipient belongs and the application IDs therefor.

Let us suppose that the members of a single household form a group. When any member of the group wishes to see the list of products scheduled for delivery, that member will be able to see at the same time a list of products scheduled for delivery to other members. Thus, if another member of the group has already designated delivery terms, by designating the same delivery terms, the family can have the products all delivered at once.

A third aspect of the present invention provides a delivery management method according to the first-mentioned aspect. In the method, when first delivery terms have been designated for a first product scheduled to be delivered to the delivery recipient, and prior to delivery of the first product, delivery terms are designated for another, second product, the delivery terms that were set for the first product are changed to the delivery terms set for the second product.

Let us suppose that a user A has designated "7/23/2000, morning," for delivery of a product Q. Thereafter, user A purchases another product, and designates delivery for "7/25/2000, evening." Usually it is reasonable to assume that the terms that were designated later are more convenient for the user. Thus if product Q has not yet been delivered, the delivery terms for product Q are also set as "7/25/2000, evening."

A fourth aspect of the present invention provides a delivery management method according to the first-mentioned aspect. In the method, when the recipient is the party that ordered the product, notification to the effect that the product specified by the application ID has been purchased is given to the provider of the product after the delivery terms corresponding to the application specified by the application ID have been designated.

Settlement of payment is conducted not at the time the product is ordered, but after delivery terms have been designated. For the user, this brings about an improvement of such situations where he or she does not receive the product even though a charge has been made to a credit card, and it also shortens the lag between the time receipt of the product and paying for the product.

A fifth aspect of the present invention provides a delivery management method according to the first-mentioned aspect. In the method, when the delivery recipient is the party that ordered the product, the provider of the product is notified that the product specified by the application ID has been purchased, the notification occurring after the delivery terms for the application specified by the application ID have been designated.

A sixth aspect of the present invention provides a delivery management method according to the first-mentioned aspect. In the method, when the delivery recipient is the party that ordered the product, the provider of the product is notified that the order for the product specified by the application ID has been cancelled, the notification occurring by means of the application specified by the application being cancelled.

When a user discovers a better product after having made an order, the user can cancel that order.

A seventh aspect of the present invention provides a delivery management device comprising accepting means, assigning means, prompting means, providing means, designating means and requesting means.

Accepting means accepts application for delivery of a product. Assigning means assigns an application ID to the application. Prompting means notifies the product delivery recipient of the application ID and prompts the delivery recipient to designate delivery terms. Providing means provides the delivery recipient with a list of products scheduled to be delivered to the delivery recipient and the application IDs therefor. Designating means receives from the delivery recipient designation of delivery terms corresponding to the application specified by the application ID after the product has been ordered. Requesting means requests delivery by notifying a predetermined delivery business of products corresponding to application IDs for which the same delivery terms have been designated, of the designated delivery terms, and of the delivery recipient.

This device of the present invention is equivalent to a server that executes the above-described method.

An eighth aspect of the present invention provides a computer-readable recording medium on which is recorded a program for executing the delivery information service method used in a delivery information service device wherein a plurality of user terminals, a plurality of transport business terminals and a plurality of vendor terminals are interconnected over a network. This program executes the following steps A through E:

A: processing for reception of product delivery request information sent from a vendor terminal or user terminal;

B: processing for storage of the received delivery request information in a delivery request information storage unit;

C: processing for extraction from the delivery request information storage unit of delivery request information for deliveries that have not yet been made, the delivery recipient being the same as the delivery recipient in the received delivery request information;

D: processing for acquiring a notification address of the delivery recipient from a correspondence table of notification addresses that are held having been corresponded beforehand with delivery recipients, and for sending notification to the notification address of the delivery recipient of the received delivery request information, of the extracted delivery-pending delivery request information, and of information prompting the input of desired delivery terms, such as desired date and time of delivery; and E: processing for transmission to a transport business terminal of information giving instruction for delivery of the article for delivery to the delivery recipient in accordance with the desired delivery terms sent from the delivery recipient.

A ninth aspect of the present invention provides a delivery information service method comprising steps of:

A: a delivery request for an article is received, the received delivery request is stored in a storage device, and the storage device is searched and delivery requests for pending deliveries with the same delivery recipient as the delivery recipient of the delivery request;

B: an address table wherein delivery recipients and notification addresses have been corresponded beforehand is referred to and the notification address of the delivery recipient is extracted;

C: notification is given to the delivery recipient notification address of the delivery request and of the extracted delivery-pending delivery request and the user is prompted to input desired delivery terms such as date and time when receipt of the article scheduled for delivery is possible; and D: based on the desired delivery terms given in response, instructions are made for delivery to the delivery recipient of the article scheduled for delivery, the instructions being given to a delivery business that has been designated by the desired conditions or that matches the desired conditions.

BRIEF DESCRIPTION OF THE DRAWINGS

FIG. 2 is a conceptual diagram for explaining the information stored in the delivery information database in the system of FIG. 1;

FIG. 3 is a conceptual diagram for explaining information stored in the user database in the system of FIG. 1;

FIG. 6A is a diagram explaining the flow of stock condition processing;

FIG. 6B is a diagram explaining the flow of delivery condition processing;

FIG. 9 is an example of a screen for the vendor to input delivery application;

FIG. 10 is an example of notification to a delivery recipient of delivery application;

FIG. 11 is an example of a screen displaying a product for delivery list;

FIG. 12 is an example of inputted delivery terms;

FIG. 13 is an example of notification to a delivery business of a delivery request;

FIG. 17 is an example of a screen displaying a product for delivery list in the system of FIG. 14;

FIG. 18 is an example of inputted delivery terms in the system of FIG. 14;

FIG. 22 is an example of a delivery terms and cancellation designation screen in the system of FIG. 19;

FIG. 27 is an example of an inputted application for delivery to a delivery recipient in the system of FIG. 23; and FIG. 28 is an example of inputted delivery terms in the system of FIG. 23.

DETAILED DESCRIPTION OF THE PREFERRED EMBODIMENTS

Overall Configuration

The delivery management system relating to the present invention makes possible the combined delivery of products for delivery to the same delivery recipient. A user can schedule a delivery after an application for delivery has been made, and can select a preferred home-delivery business to make the delivery. Also, combined delivery can be made of products for delivery to the same household. When a gift is to be sent to another person, the recipient of the gift can schedule delivery for a date and time convenient to him or her after the gift giver has purchased the gift and made an application for delivery. This eliminates cases where the pleasures of gift-giving and receiving are diminished because recipient of the gift learns beforehand that a gift is to be made.

First Embodiment (1) Configuration of Delivery Management System

Figure 1:
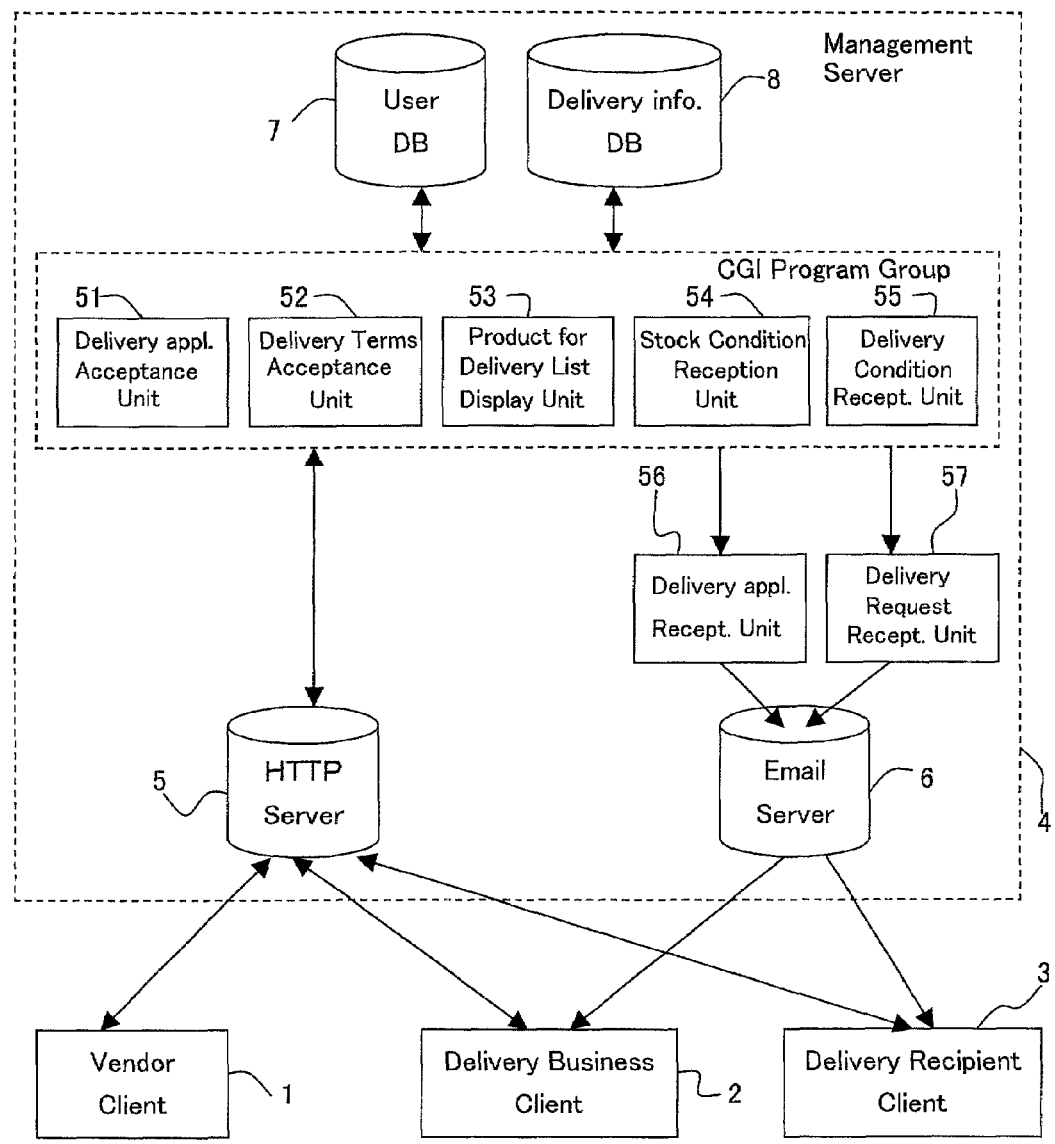
FIG. 1 is an overall block diagram of the delivery management system relating to the first embodiment.

FIG. 1 is an overall block diagram of the delivery management system relating to a first embodiment of the present invention. The delivery management system in the present embodiment comprises a vendor client 1, a delivery business client 2, a delivery recipient client 3 and a management server 4 interconnected via a network (not shown in the figure) governed by HTTP. Vendor herein means the party providing products, and includes the manufacturer of a product.

The management server 4 has an HTTP server 5 and an email server 6. The HTTP server 5 and the email server 6 do not have to be on the same computer, and may operate on independent computers. The HTTP server 5 functions as the front end, receiving connections from clients.

Specifically, the HTTP server 5 activates in response to the type of request a CGI program group represented by a delivery application acceptance unit 51, a delivery terms acceptance unit 52, a product for delivery list display unit 53, a stock conditions reception unit 54 and a delivery terms reception unit 55. Using these CGI programs, the HTTP server 5 also manages a delivery information database 8 in which delivery information is stored and a user database 7 in which personal information for delivery recipients is stored. The HTTP server 5 also activates CGI programs represented by a delivery application transmission unit 56 and a delivery request transmission unit 57. These programs access the email server 6 and send email messages to the delivery business client 2 and the delivery recipient client 3.

Each client, that is, the vendor client 1, the delivery business client 2 and the delivery recipient client 3, are computers with functions for accessing the management server 4. Personal computers and cell phones having WW browser functions are examples of such clients. These clients also have email receipt and transmission functions.

(2) Database (2-1) Delivery Information Database

FIG. 2 is a conceptual drawing showing information stored in the delivery information database 8. Herein, "delivery recipient ID" is the ID allocated to delivery recipients in this system. In the "requester" column the names of parties requested delivered are entered. The delivery recipient and the requester may be the same person or they may be different. In the present embodiment, in order to facilitate explanation, an explanation will be given for a case where they are the same. The "vendor" is the party that makes the application for delivery, i.e., the shipper of the product to be delivered. In the "item for delivery" column the items products for delivery are entered.

This database also has fields for "delivery date," "delivery place," and "delivery business." These fields are left blank until the delivery recipient makes designations for delivery terms.

The "application ID" is identification information that the system has allocated to one set of the above information. The "stock conditions" and "delivery terms" are input by the product vendor and delivery business, respectively.

(2-2) User Database

FIG. 3 is a conceptual diagram showing information stored in the user database 7. Stored in this database are "user ID," and the "name," "delivery place," "address," "email address," and "telephone number" of the delivery recipients. A plurality of delivery places can be registered for each user ID, with addresses and telephone numbers designated for each delivery place. Users who are product delivery recipients or requesters are registered as users in the user database 7 prior to their use of this system.

(3) Processing Flow (3-1) Delivery Acceptance Reception

Figure 4:
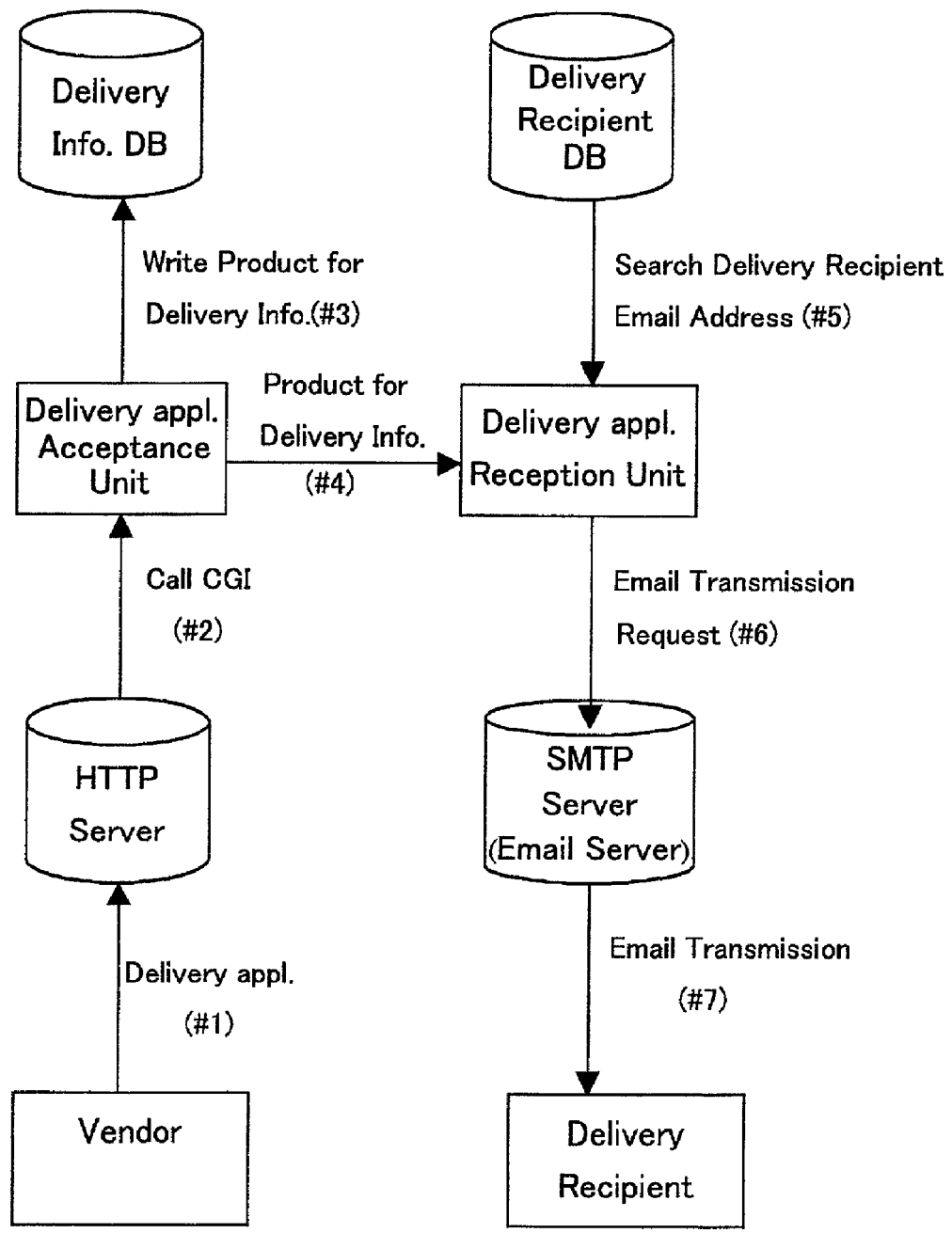
FIG. 4 is a diagram showing the flow of delivery application acceptance processing.

FIG. 4 is diagram explaining the flow of delivery acceptance processing conducted by the HTTP server 5.

When a vendor wishes to make a request for delivery to a delivery business, it first accesses the HTTP server 5 with a WWW browser and applies for a delivery (#1). This application is made by inputting predetermined information relating to the product to be delivered (refer to FIG. 9 below).

The HTTP server 5 upon receipt of the input information, activates the CGI program of the delivery application acceptance unit 51 (#2).

Figure 5:
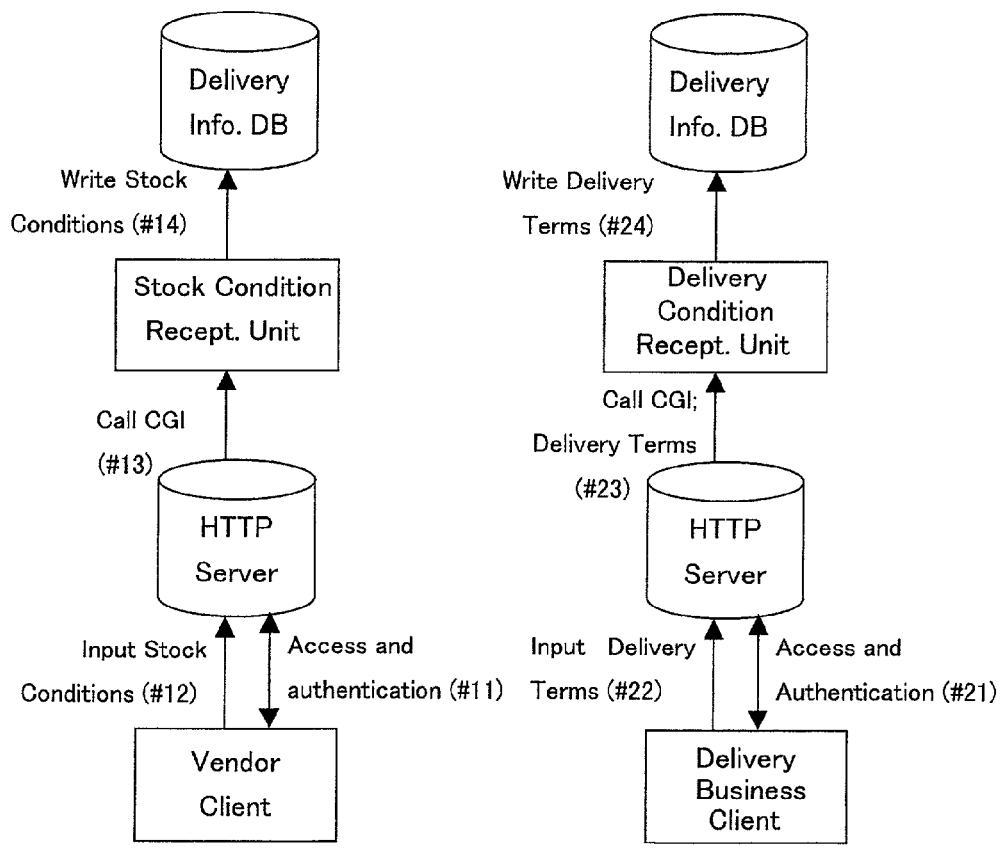
FIG. 5 is a diagram for explaining product for delivery information.

The delivery application acceptance unit 51, based on the input information, creates product to be delivered information as shown in FIG. 5 and writes product to be delivered information to the delivery information database 8 (#3). As shown in the figure, product to be delivered information contains delivery recipient user ID (hereinafter "delivery recipient ID"), requester user ID (hereinafter "requester ID"), deliverer, product for delivery, and application ID.

The delivery application acceptance unit 51 calls the delivery application transmission unit 56 CGI program and provides it with product for delivery information (#4). The delivery application transmission unit 56 accesses the user database 7 and searches for the delivery recipient email address using the delivery recipient ID as the key (#5).

The delivery application transmission unit 56 accesses the email server 6 and sends delivery notification to the delivery recipient email address (#6, #7). This notification contains the URL for a web page on which is posted predetermined information relating to the delivery. An email message stating that a product delivery application has been made is sent to the delivery recipient (refer to FIG. 10 below).

(3-2) Registration Processing for Stock Conditions and Delivery Terms

FIG. 6A is a diagram explaining the flow of stock condition registration processing conducted by the HTTP server 5 and FIG. 6B is a diagram explaining the flow of delivery condition registration processing conducted by the HTTP server 5. In these processings, vendors and delivery businesses register stock conditions and delivery terms, respectively, in the delivery information database 8. Stock condition registration processing and delivery condition registration processing are the same except for the fact that the registered information pertains either to stock conditions or delivery terms; thus an explanation will be given below just of the stock conditions.

When the vendor client 1 accesses the management server 4, authentication processing is conducted (#11, #21). When authentication is made, the vendor client 1 sends stock conditions (#12, #22). Application ID is included in these stock conditions. The HTTP server 5, upon receipt thereof, activates the stock conditions reception unit 54 CGI program (#13, #23). The stock conditions reception unit 54 accesses the delivery information database 8, and with the application ID as the key, updates the stock conditions for the relevant product (#14, #24).

(3-3) Notification of Product for Delivery List Processing

Figure 7:
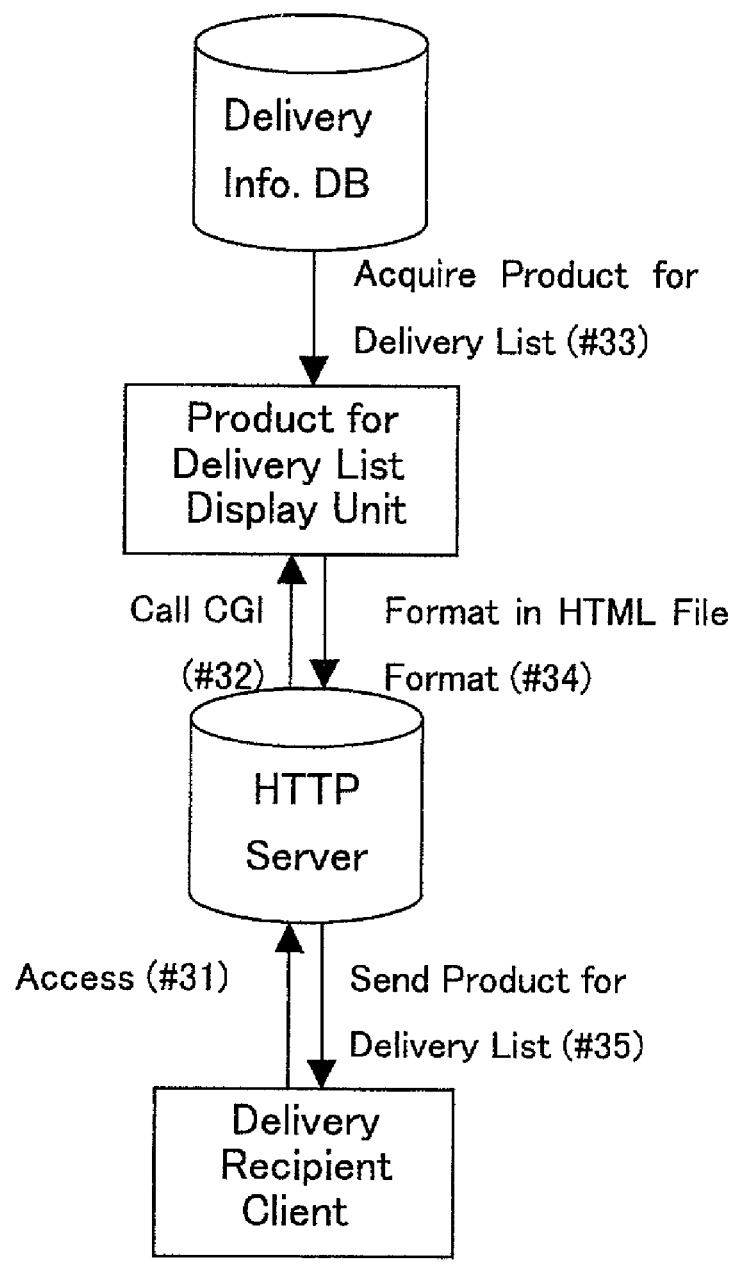
FIG. 7 is a diagram explaining the flow of product for delivery list notification processing.

FIG. 7 is a diagram explaining the flow of notification of product for delivery list processing conducted by the HTTP server 5. When a delivery recipient uses a WWW browser to access the URL for which notification was given by email (#31), the HTTP server 5 authenticates the delivery recipient. When the delivery recipient is authenticated, the product for delivery list display unit 53 CGI program is activated (#32).

The product for delivery list display unit 53 accesses the delivery information database 8, and using the delivery recipient ID as a key, acquires a list of products for delivery scheduled to be delivered to the delivery recipient (#33). The product for delivery list display unit 53 then formats the acquired information in HTML file format (#34) and provides this to the delivery recipient (#35). At the delivery recipient client 3, the WWW browser displays a product for delivery list form (see FIG. 11 below). Designation of delivery terms, to be discussed below, can be input into this product for delivery list form (refer to FIG. 12 below).

(3-4) Delivery Terms Designation Processing

Figure 8:
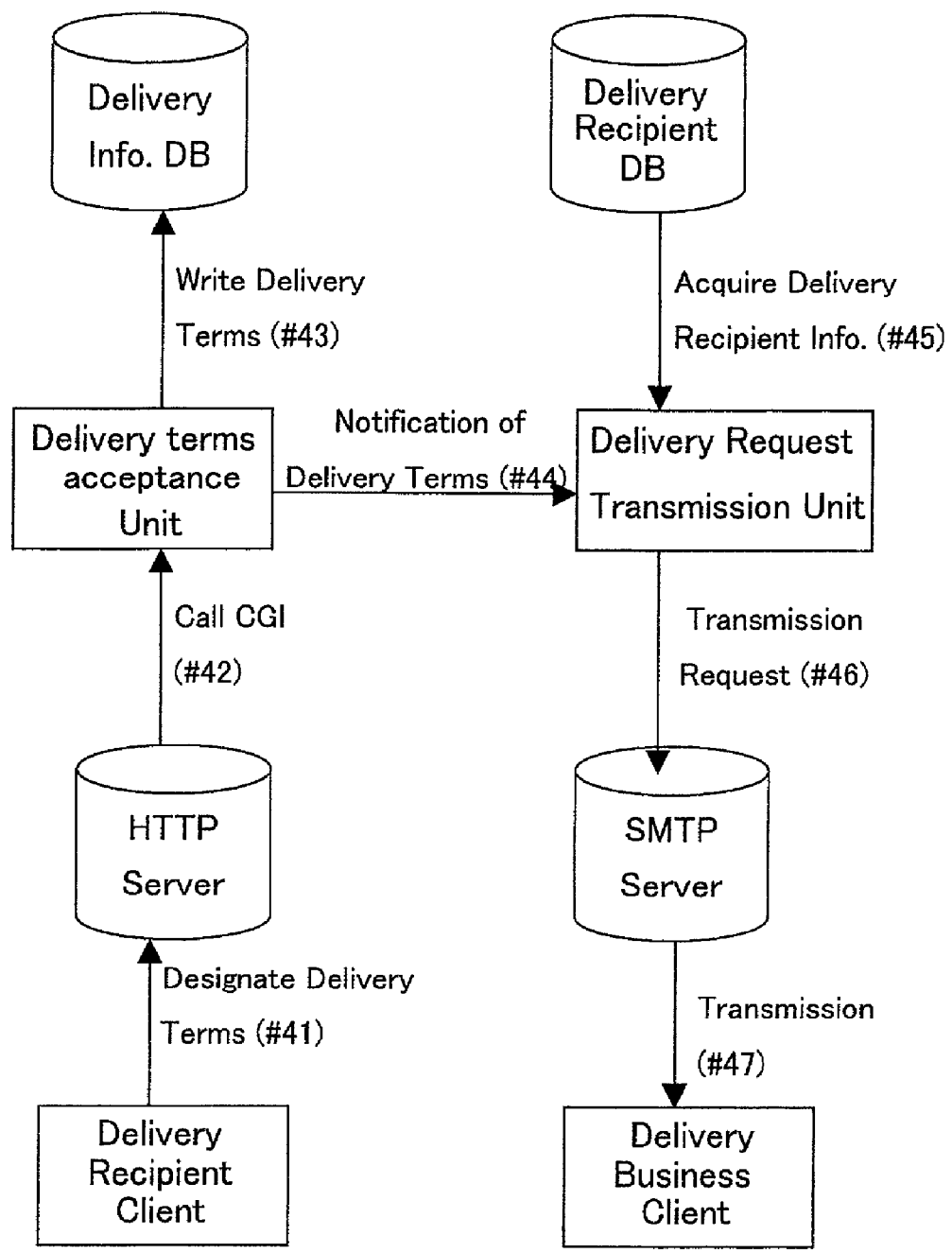
FIG. 8 is a diagram explaining the flow of delivery terms designation processing.

FIG. 8 is a diagram showing the flow of delivery terms designation processing conducted by the HTTP server 5.

When a delivery recipient inputs delivery terms into the form and sends this to the HTTP server 5 (#41), the HTTP server 5 calls the delivery terms acceptance unit 52 CGI program (#42). These delivery terms are delivery date, delivery place, delivery business, etc.; they correspond to items in the delivery information database 8. The designation of delivery terms may be made at a point in time when the delivery recipient knows for certain what date and time, for example, are convenient, and does not have to be made immediately after receipt of delivery application notification, or immediately after viewing the products for delivery list.

The delivery terms acceptance unit 52 accesses the delivery information database 8 and writes the received delivery terms therein (#43). The delivery terms acceptance unit 52 also calls the delivery request transmission unit 57 program and provides it with the delivery terms (#44). The delivery request transmission unit 57 accesses the user database 7, and using the delivery recipient ID as a key, acquires delivery recipient information such as the delivery recipient's name, address and phone number (#45). Next, the delivery request transmission unit 57 accesses the email server 6 and sends to the delivery business client 2 an email message requesting delivery that contains the delivery terms and the delivery recipient information (#46).

It should be noted that this designation of delivery terms can be partially automated. For example, let us suppose that delivery terms X have been designated for a certain product A; then, prior to delivery of this product A, there is a delivery request for another product B. Because it can be said that if the delivery terms X are followed it is guaranteed that the delivery recipient will be able to receive the delivery, the system can be programmed so that the delivery terms set for the product A are automatically set for the product B without asking the delivery recipient to set delivery terms. On such an occasion, it is fine to notify the user that an additional product will be delivered on the scheduled delivery day. As long as there is an item that has not yet been delivered, arrangements will be automatically made so that any new item for delivery will be delivered along with it. This means that the user does not have to go through the trouble of designated delivery terms every time there is a new product for delivery, and the delivery business has to make fewer individual deliveries due to such factors as delays in response from the delivery recipient, meaning that it will be able to make deliveries in which the products to be delivered are combined to the greatest extent possible, leading to increased efficiency. Also conceivable is the opposite case, where the delivery terms Y for product B set afterwards reflect the delivery recipient user's most up-to-date desired terms. In such cases, the system can be programmed so that the delivery terms X for not yet delivered product A are automatically changed to reflect the delivery terms for the newly ordered product B. Or the system may be programmed so that when delivery terms have been designated for product B, the user is notified that there is a delivery-pending product for which differing delivery terms have been designated, and change of the delivery terms is conducted only after the user confirms that it is all right to do so. Thus when a user has changes in plans after having designated delivery terms, those changes are automatically reflected in the delivery terms, the user does not have to bother changing the delivery terms, and the delivery business can reduce losses due to changes in the plans of the delivery recipient user.

With the above processing, after a product has been ordered, a user can designate a date and time for delivery according to changes in his or her schedule and have a delivery made accordingly. Moreover, because a delivery recipient can receive a plurality of packages at once, a delivery business will benefit from a reduction in the time and effort involved in delivery and can therefore lower its delivery charges, meaning that both the charges for delivery and the time and effort spent in receiving a delivery will be reduced. In addition, the provider of the management server 4 can realize a profit by collecting a portion of the cost savings as a handling fee.

(4) Screen Examples

FIG. 9 is an example of an input screen for the vendor to input a delivery application. In this example, the screen is posted on a web page. The delivery recipient ID and the requester ID may be the same or they may be different. When the product is a gift, for example, these IDs will be different.

FIG. 10 is an example of a notification to a delivery recipient of a delivery application. The URL of the web page for inputting delivery terms is given here. In addition, it is also preferable to include the product for delivery and the name of the vendor.

FIG. 11 is a display example of a products for delivery list. In this example, this screen is provided on a web page. Delivery date, delivery place and delivery business can be set or changed on this screen. This figure shows a case where the delivery terms have not yet been designated.

FIG. 12 is an example showing delivery terms inputted. It is convenient for the user if a pull-down menu displays possible choices when inputting delivery terms, for example, delivery place and delivery business. On this form, not only can items that have not yet been set be set, but items that have already been set can be changed.

FIG. 13 is an example of a notification to a delivery business of a delivery request. Delivery date and time have been given as delivery terms, and name, address and phone number have been given as delivery recipient information. Also, the product to be delivered and the vendor name have also been given.

Second Embodiment (1) Configuration of Delivery Management System

Figure 14:
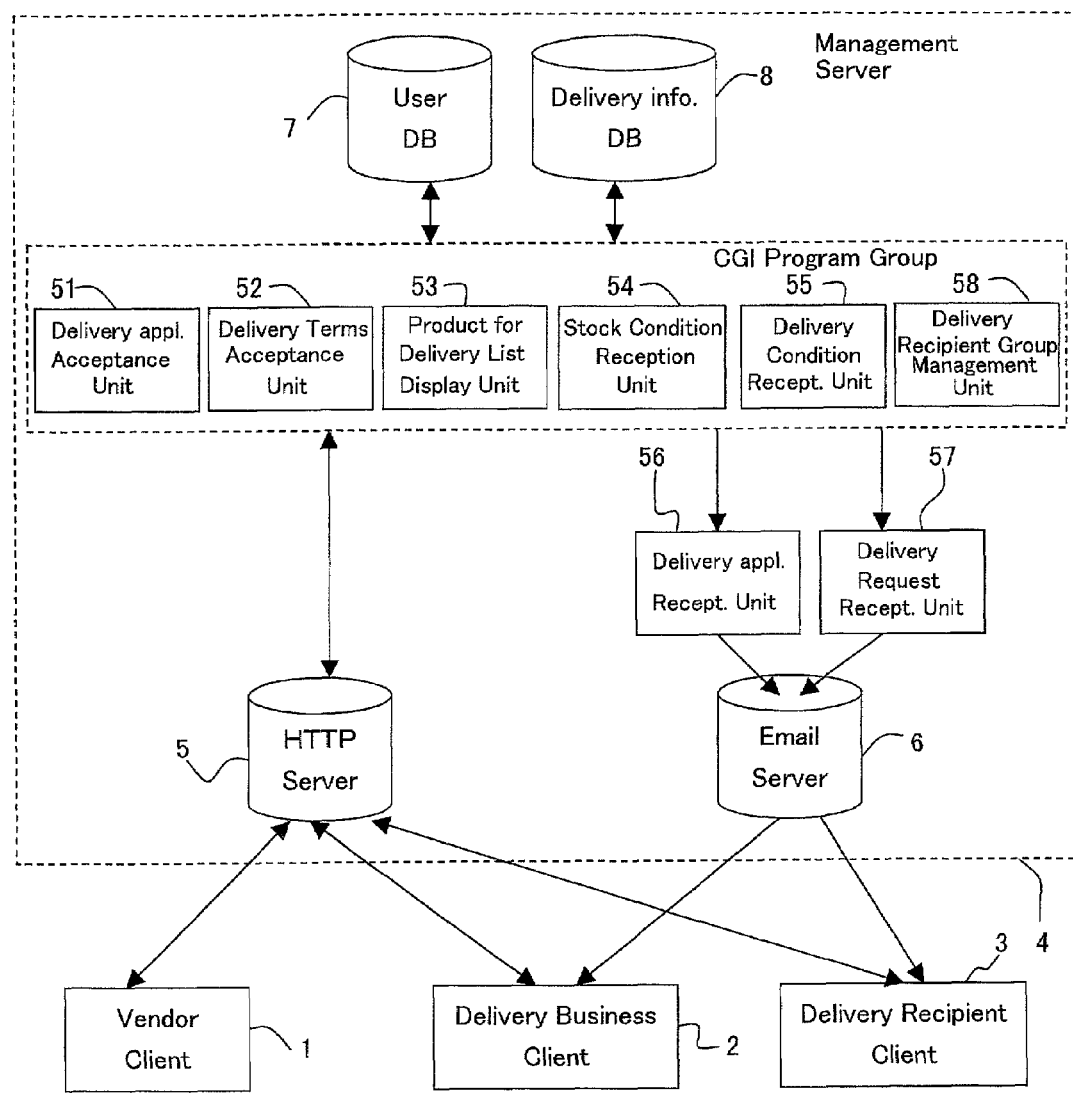
FIG. 14 is an overall block diagram of the delivery management system relating to the second embodiment.

FIG. 14 is a block diagram showing the overall constitution of the delivery management system according to a second embodiment. In this system, a delivery recipient group management unit 58 has been added to the constitution of the delivery management system according to the first embodiment. Delivery recipients are groups formed beforehand in units, for example, of households. The delivery recipient group management unit 58 receives registration of members of a group from delivery recipients and registers these in the user database 7.

Figures 15, 16:
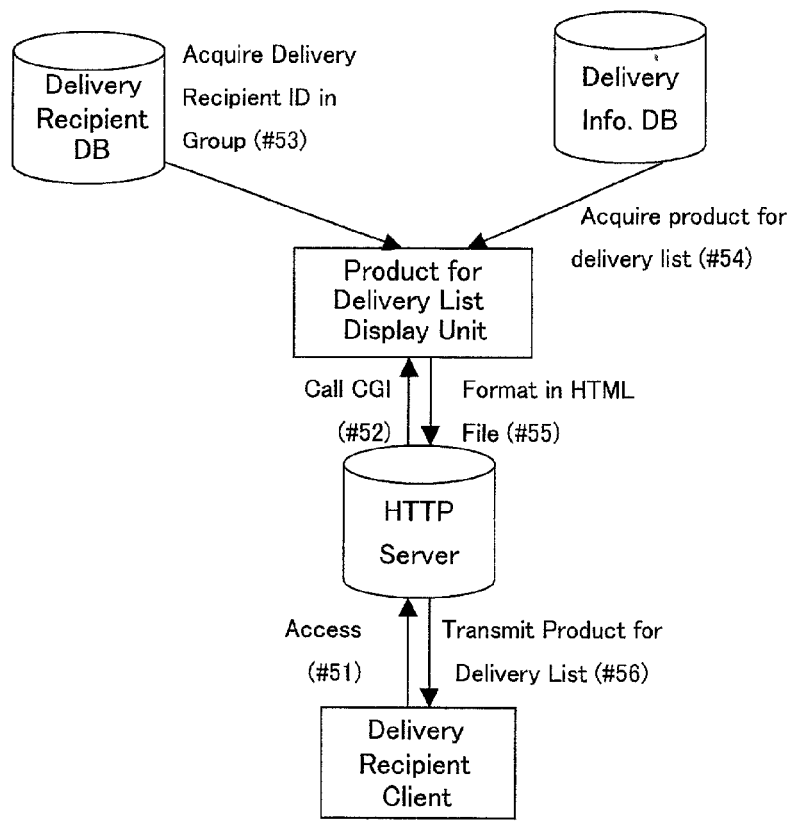
FIG. 15 is a conceptual diagram for explaining the information stored in the user database in the system of FIG. 14.
FIG. 16 is a diagram explaining the flow of product for delivery list notification processing in the system of FIG. 14.

As shown in FIG. 15, this user database 7 differs from the user database 7 in the first embodiment in that information for "group" is stored. The other stored information is the same as above.

Other constituent elements having the same designator as in FIG. 1 have the same function as the corresponding element in the first embodiment.

(1) Processing Flow

In the present embodiment, the processing flow for delivery acceptance processing, stock condition/delivery condition registration processing and delivery terms designation processing is the same as in the first embodiment. In addition to these processings, this system performs the following processing:

Products for Belivery List Notification Processing

FIG. 16 is a flow chart showing the flow of products for delivery list notification processing.

When a delivery recipient uses a WWW browser to access the management server 4 (#51), delivery recipient authentication based on delivery recipient ID is conducted. Upon authentication, the product for delivery list display unit 53 CGI program is activated, and it is provided with the delivery recipient ID (#52). The product for delivery list display unit 53 accesses the user database 7, and with the delivery recipient ID as key, acquires the delivery recipient ID of other members of the group to which the accessing delivery recipient belongs (#53).

Next, the product for delivery list display unit 53 accesses the delivery information database 8, and using the group members' delivery recipient IDs as keys, acquires a list of scheduled products for delivery scheduled to be delivered to a delivery recipient belonging to that group (#54). This is formatted in HTML file format (#55), and sent to the accessing delivery recipient (#56).

(2) Screen Example

FIG. 17 is a screen example showing a product for delivery list. In addition to products for delivery to the accessing delivery recipient, a list of products for delivery scheduled to be delivered to members of the group to which the accessing delivery recipient belongs is displayed FIG. 18 show a delivery terms input example. As with the first embodiment, the delivery recipient uses this to designate such delivery terms as delivery date, delivery date, delivery business, etc. and the delivery terms are notified to the delivery business. In this figure, the items that have not yet been set, that is, delivery date, delivery place, and delivery business, can be changed only by the delivery recipient user him or herself. In principle, the items set for other group members cannot be changed. But the system may be set so that the items of other group members can be changed according to need.

As described above, in the present embodiment, among user groups such as families, a plurality of deliveries can be combined into one, making possible a further improvement in delivery efficiency.

Third Embodiment (1) Configuration of Delivery Management System

Figure 19:
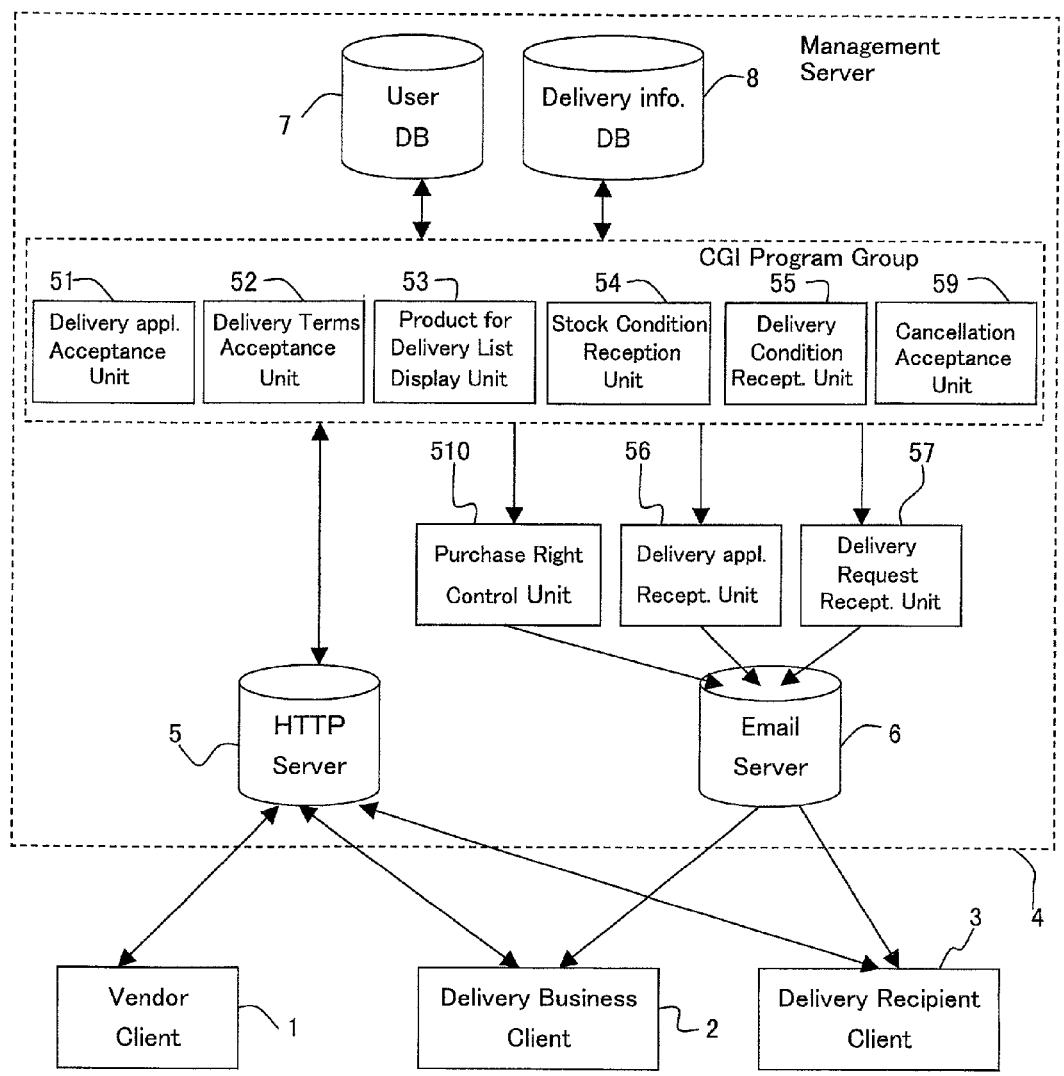
FIG. 19 is an overall block diagram of the delivery management system relating to the third embodiment.

FIG. 19 is a block diagram showing the overall constitution of the delivery management system according to a third embodiment of the present invention. This system comprises the delivery management system according to the first embodiment, with the addition of a cancellation acceptance unit 59 and a purchase right control unit 510. Other constituent elements having the same designator as in FIG. 1 have the same function as the corresponding element in the first embodiment.

The cancellation acceptance unit 59 accepts cancellation of orders for products.

The purchase right control unit 510 notifies the vendor client 1, when delivery terms have been designated for a delivery application, that a product specified by the ID for that application has been purchased.

(2) Processing Flow

In the present embodiment, the processing flow for delivery acceptance processing, stock condition/delivery condition registration processing and products for delivery list notification processing is the same as in the first embodiment. In addition to these processings, this system performs delivery terms designation processing and cancellation processing, as described below.

(2-1) Delivery Terms Designation Processing

Figure 20:
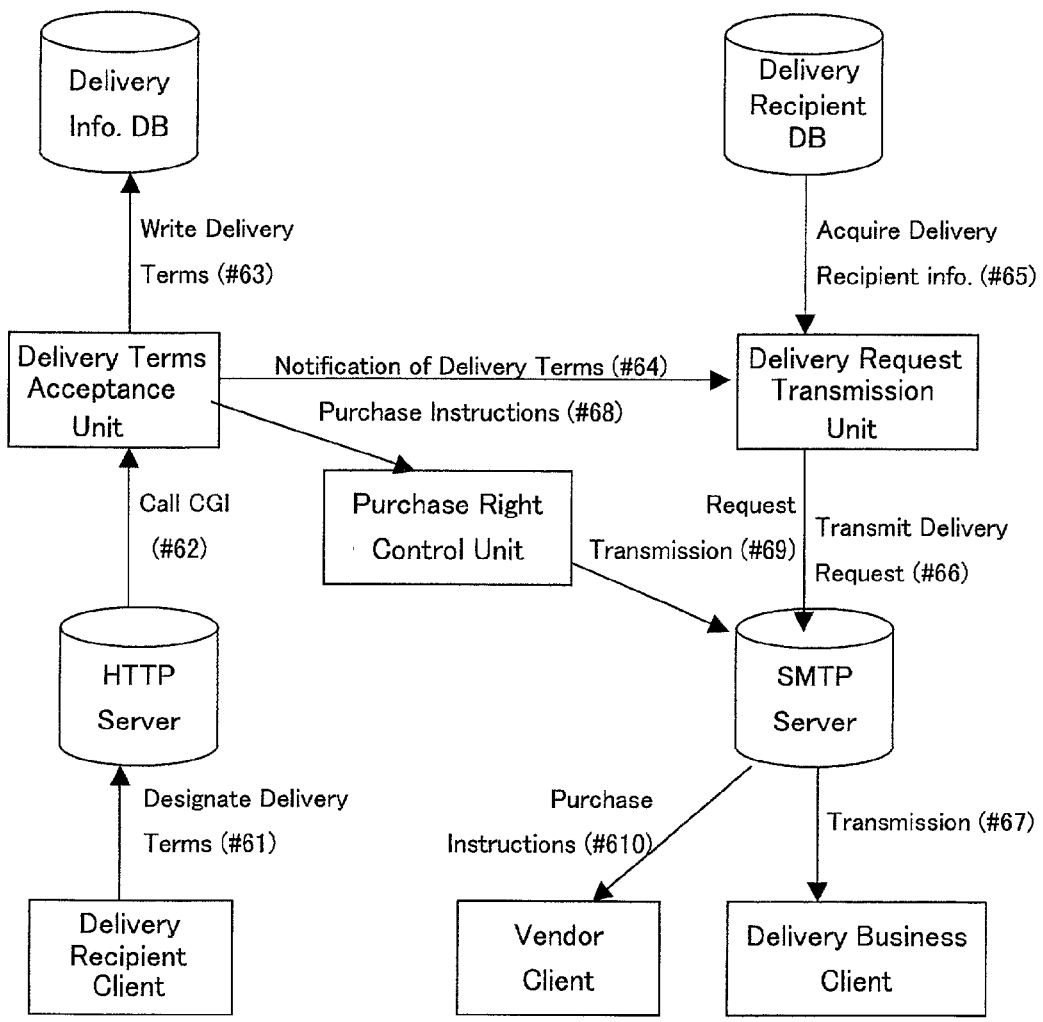
FIG. 20 is a diagram explaining the flow of delivery terms designation processing in the system of FIG. 19.

FIG. 20 is a diagram showing the flow of delivery terms designation processing performed by the HTTP server 5. The processing for writing designation of delivery terms in the delivery information database 8 (#61 to #63) and sending delivery recipient information and sending said designation to the delivery business client 2 (#64 to #67) is the same as in the first embodiment.

The delivery terms acceptance unit 52 further calls the purchase right control unit 51 CGI program, and provides it with purchase instructions (#68). These instructions include application ID and product name for specifying the product for which delivery terms have been set.

The purchase right control unit 510 accesses the email server 6 and sends the vendor client 1 notification of the purchase instructions, including application ID and product name (#69, #610). The vendor, upon receipt of this notification, performs settlement processing for invoicing the delivery recipient for the charges for the product.

This processing allows the time lag between the time of payment for the ordered product and time of delivery of that product to be shortened. Also, the party that ordered the product can put off paying for the product until the product is actually available for delivery.

(2-2) Cancellation Processing

Figure 21:
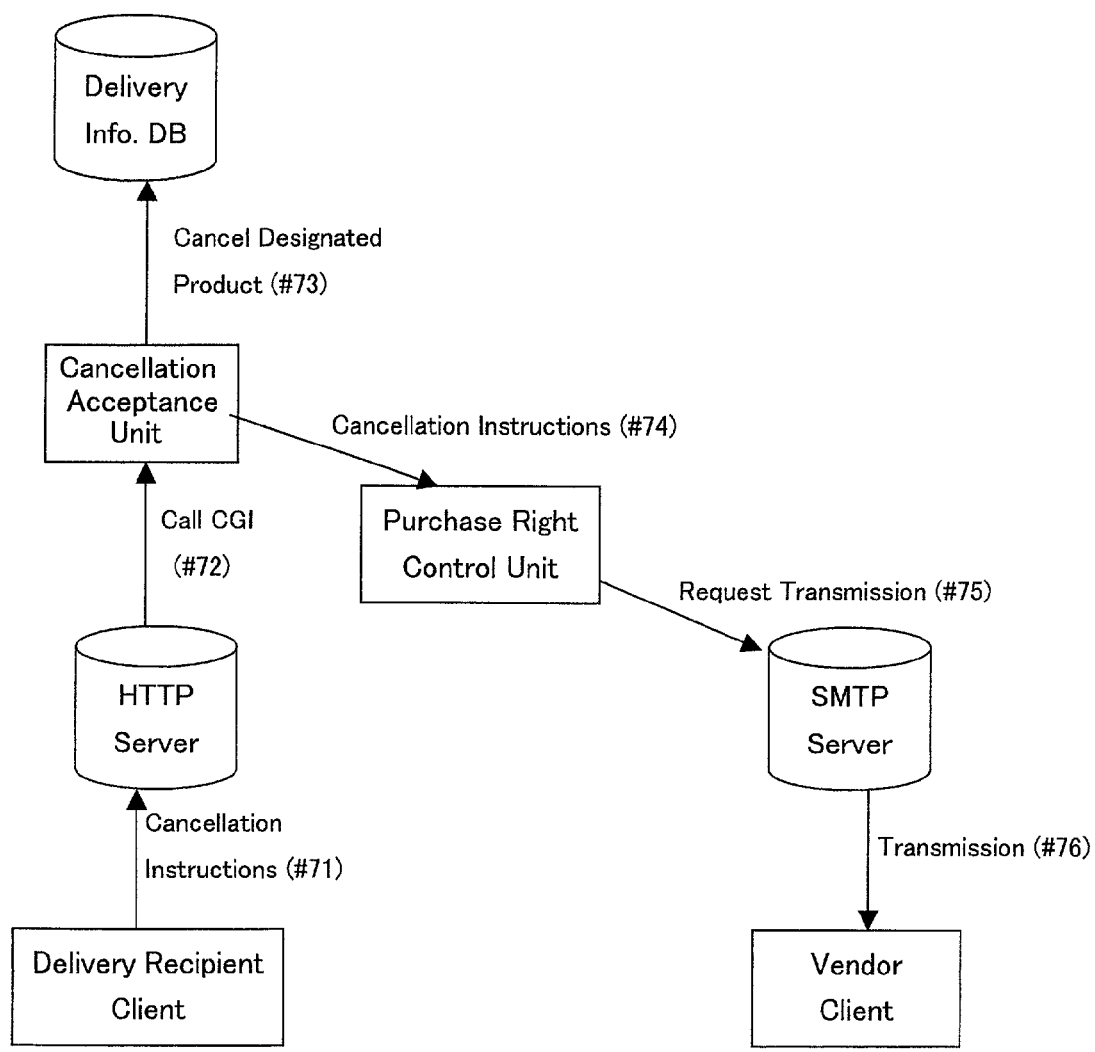
FIG. 21 is a diagram explaining the flow of cancellation processing in the system of FIG. 19.

FIG. 21 is a diagram showing the flow of cancellation processing performed by the HTTP server 5.

In this example, an application for delivery can be cancelled using the form for inputting delivery terms (see FIG. 22 below). The HTTP server 5 receives a cancellation (#71), and calls the cancellation acceptance unit 59 CGI program (#72). The cancellation acceptance unit 59 accesses the delivery information database 8 and deletes the entry for the cancelled application (#73). The HTTP server 5 calls the purchase right control unit 510 CGI program and provides it with the application cancellation instructions (#74). These instructions contain the ID for the cancelled application. The purchase right control unit 510 accesses the email server 6, and sends to the vendor client 1 notification that the order for the product relating to the application has been cancelled (#75, #76).

With this processing, if the party that has made the order finds a better product before making payment, that party can make a change with a minimum of cost and effort. The vendor may charge the delivery recipient a cancellation penalty, in the form of a cancellation fee.

(3) Screen Example

FIG. 22 shows an example of a screen using which a delivery recipient designates delivery terms and cancellation. By checking the "cancel" field, a delivery recipient can cancel the purchase of a product.

Fourth Embodiment (1) Configuration of Delivery Management System

Figure 23:
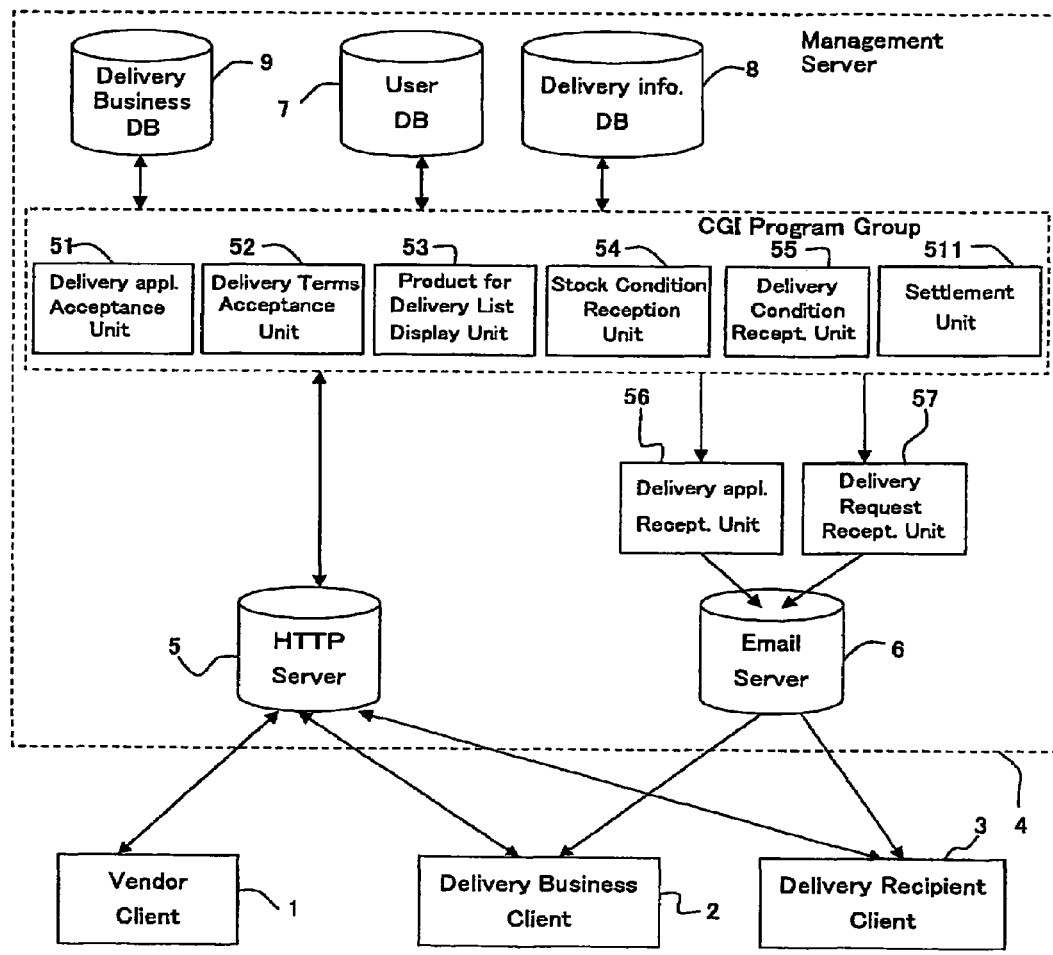
FIG. 23 is an overall block diagram of the delivery management system relating to the fourth embodiment.

FIG. 23 is a block diagram showing the overall constitution of the delivery management system according to a fourth embodiment of the present invention. This system comprises the delivery management system according to the first embodiment, with the addition of a settlement unit 511 and a delivery business database 9. In addition, the delivery information database 8 is provided with a delivery charge payer field (not shown). The user database 7 is provided with a credit card information field (not shown). Other constituent elements having the same designator as in FIG. 1 have the same function as the corresponding element in the first embodiment.

The delivery business database 9 is shared by this system and delivery businesses, and can be updated by delivery businesses. There may be a plurality of databases, one for each delivery business, or this database may be on servers managed by delivery businesses. This database stores the delivery schedule of the delivery business, and rate data according to delivery region and type of delivery service.

The settlement unit 511 performs settlement processing for invoicing the party that will pay the charges. For settlement processing, it is good to store credit card information beforehand in the user database 7.

(1) Processing Flow

As with the first embodiment, this system performs stock condition and delivery condition registration processing. In addition to these processings, the following processings are performed in this system.

(2-1) Delivery Acceptance Processing

With the exception of the following points, the HTTP server 5 performs delivery acceptance processing in the same manner as in the first embodiment (not shown in figure). The vendor client 1 accesses the email server 6 and sends a delivery application (see FIG. 27 below). In addition to the contents as described in the first embodiment, this application allows entry of which party will pay for the charges, in the event that the delivery recipient ID and the requester ID are different.

Figures 24, 25:
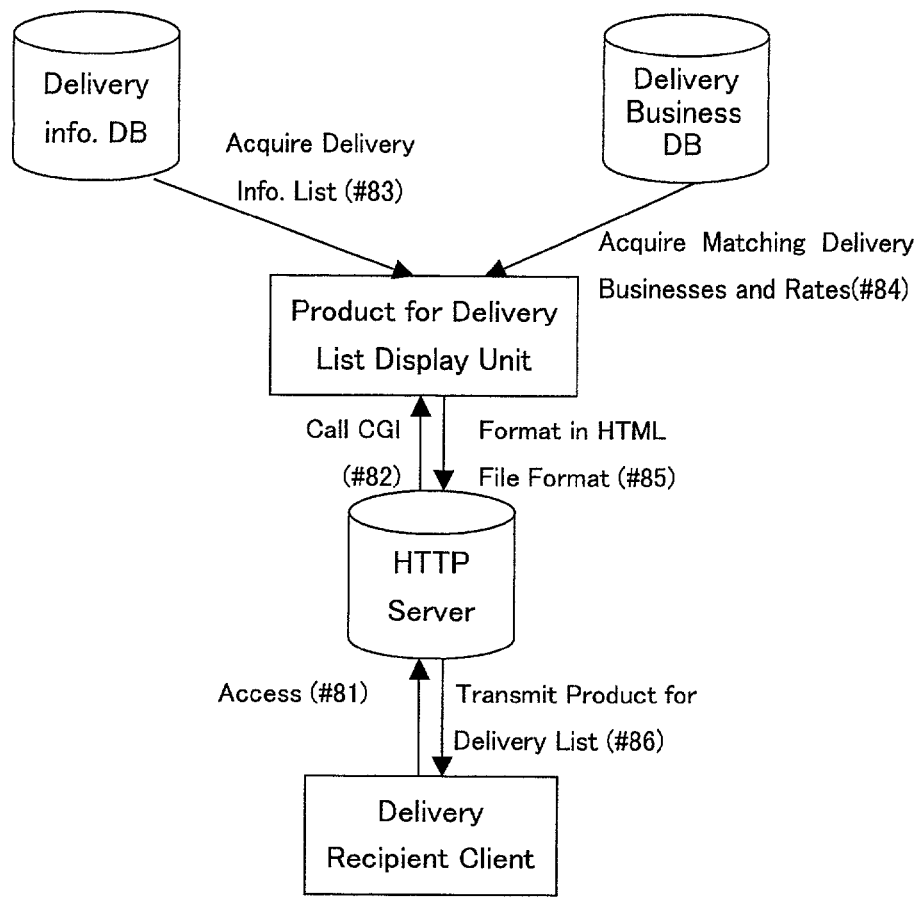
FIG. 24 is a diagram explaining the flow of product for delivery list notification.
FIG. 25 is a conceptual diagram of product for delivery information in the system of FIG. 23.

The delivery application acceptance unit 51 creates delivery product information from the input contents it has received. FIG. 25 is a conceptual diagram of the delivery product information. In addition to delivery recipient ID, requester ID, vendor, and product for delivery application ID, the charge payer is also included. The delivery application acceptance unit 51 accesses the delivery information database 8 and writes this product for delivery information therein.

(2-2) Product for Delivery List Notification Processing

FIG. 24 is a diagram showing the flow of product for delivery list notification processing performed by the HTTP server 5.

When a delivery recipient accesses management server 4 using a WWW browser (#81), the HTTP server 5 performs authentication based on delivery recipient ID and the like. Upon authentication, the product for delivery list display unit 53 CGI program is activated (#82). The product for delivery list display unit 53 first accesses the delivery information database 8, and using delivery recipient ID as the key, acquires a list of products for delivery to the accessing delivery recipient as well as the delivery information therefor (#83).

Next, the product for delivery list display unit 53, using delivery information as key, searches the delivery business database 9. For example, using delivery place and delivery date as keys, it searches the schedule of the delivery business. Then it acquires a list of delivery businesses that can deliver the product for delivery as well as the charges for that delivery (#84).

The product for delivery list display unit 53 formats the acquired information in HTML file format and sends this in an email message to the delivery recipient (#85, #86). A form that includes delivery charges and delivery services is displayed at the delivery recipient client 3.

(2-2) Delivery Terms Designation Processing

Figure 26:
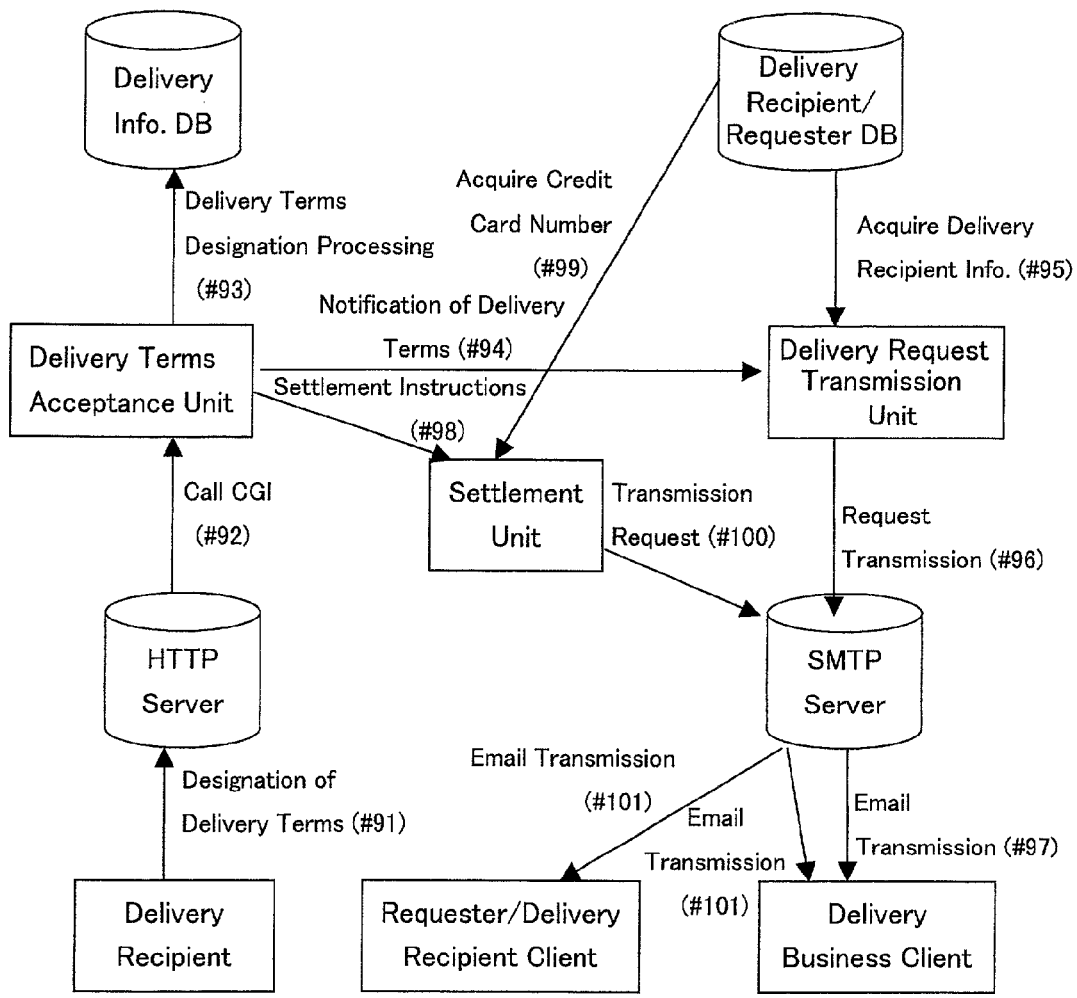
FIG. 26 is a diagram showing the flow of delivery terms designation processing in the system of FIG. 23.

FIG. 26 is a drawing showing the flow of delivery terms designation processing performed by the HTTP server 5.

The HTTP server 5 receives the designation of delivery terms inputted into the above-described form (#91) and calls the delivery terms acceptance unit 52 CGI program (#92). The delivery terms acceptance unit 52, as in the first embodiment, writes the delivery terms (#93) and gives notification of the delivery terms (#94). Thus the delivery recipient information is sent as email to the delivery business client 2 (#95, #96, #97).

Next, the delivery terms acceptance unit 52 provides settlement instructions to the settlement unit 511 (#98). In other words, instructions are given to the settlement unit 511 to assess charges against the party to bear the charges. The settlement unit 511 accesses the user database 7 and, using delivery recipient ID as the key if the delivery recipient is to bear the charges, or requester ID as the key if the requester is to bear the charges, acquires the credit card number to be used for settling the charges (#99). The settlement unit 511, in addition to performing settlement processing, accesses the email server 6 (#100) and sends an email message giving notification of the settlement to the client of the appropriate party (#101).

With the above processing, instead of the conventional uniform charges, charges can be collected that accurately reflect delivery terms. It also becomes possible to decide on delivery terms such that the delivery recipient schedule and the schedule of the delivery business match. A delivery business may implement a service, for example, that offers a discount when all the packages can be loaded into a single truck.

(2) Screen Examples

FIG. 27 is an example of an input screen for a vendor to apply for delivery. Unlike the first embodiment, there is a field for input of charge payer.

FIG. 28 is an example of inputted delivery terms displayed at the delivery recipient client 3. Only those delivery businesses that can make delivery fulfilling such delivery terms as delivery date and desired type of service are displayed in a pull-down menu. Types of service include, for example, special rush delivery, over-sized packages, and delivery in refrigerated trucks. In addition, charges are displayed according to the selected delivery terms. The total current charges that the delivery recipient is to pay are also displayed. The system may be programmed so that when the delivery recipient and the requester are different, and the requester is to pay the charges, the charges are displayed but not included in the total, or the charges are not displayed.

OTHER EMBODIMENTS (A) In the above embodiments, CGI programs are used, but other technology that performs similar functions may be used, such as Java servlets. Also, communication means other than email may be used for performing notification of delivery application and delivery requests.

(B) The above embodiments may be combined as needed.

(C) A recording medium on which is recorded a program for executing the above-described methods of the present invention is included in the present invention. Possible types of recording media include computer-readable floppy diskettes, hard disks, semiconductor memory, CD-ROMs, DVDs, magneto-optical disks, etc.

By using the present invention a user can know, before a product actually arrives, when a product scheduled for delivery will be delivered, and can receive deliveries from a plurality of delivery businesses around the same time or the delivery of a plurality of products at once, reducing both delivery charges and the effort involved in receiving deliveries. Families and other groups can also receive deliveries from a plurality of delivery businesses around the same time or the delivery of a plurality of products at once. Moreover, even after applying for delivery, a delivery recipient can make designations for delivery terms that match changes in his or her schedule.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments set forth in the present invention is provided for illustration only, and not for the purpose of limiting the invention as defined by the appended claims and their equivalents.

What is claimed is:

1. A method for managing delivery of products that have been ordered, comprising:
   presenting a screen which accepts delivery applications of the products to a provider of the products, and accepting applications on the screen for delivery of said products from the provider of said products;
   assigning application ID's to said applications;
   presenting a screen which notifies a delivery recipient of the products, and accepting a designation of delivery terms on the screen;
   presenting said delivery recipient with a screen displaying a list of the products scheduled to be delivered to said delivery recipient and said application ID's therefore;
   presenting a screen which accepts designation of delivery terms for the applications specified by said application ID's from said recipient, and accepting designation of delivery terms on the screen from said delivery recipient after orders of said products; and
   presenting a screen which displays the products corresponding to application ID's for which the same delivery term has been designated, the designated delivery terms, and the delivery recipient to a delivery business being specified by the designated delivery terms;
   wherein the delivery terms comprise a date and time of delivery.

2. A delivery management method in accordance with claim 1, further comprising accepting formation of a group and designation of group members from said delivery recipient; and
   said presenting a screen which notifies further comprising a group notification giving notification of a list of products scheduled for delivery to other members of the group to which the delivery recipient belongs and the application ID's therefore.

3. A delivery management method according to claim 1, wherein:
   said accepting applications further comprises accepting an application for delivery of a first product of said products and an application for delivery of a second product of said products;
   said accepting designation of delivery terms further comprises accepting designation of a first delivery term of said delivery terms for the first product and designation of a second delivery term of said delivery terms for the second product; and
   the delivery management method further comprising:
   judging whether prior to delivery of said first product, a second delivery term is designated for the second product; and
   changing the first delivery term set for said first product to the second delivery term set for said second product according to a result of said judging.

4. A delivery management method according to claim 1 wherein:
   said accepting delivery applications further comprising accepting an application for delivery of a first product of said products and an application for delivery of a second product of said products;
   said accepting designation of delivery terms further includes accepting designation of a first delivery term of said delivery terms for the first product and designation of a second delivery term of said delivery terms for the second product; and
   the delivery management method further comprising;
   judging whether the application for delivery of the second product is accepted prior to delivery of said first product; and
   changing the second delivery term to the first delivery term according to a result of said judging.

5. A delivery management method according to claim 1, further comprising:
   judging whether said delivery recipient is the party that ordered said products; and
   notifying the provider of said products that the products specified by said application ID's have been purchased after said term accepting, according to a result of said judging.

6. A delivery management method according to claim 1, further including:
   judging whether said delivery recipient is the party that ordered said products;
   accepting cancellation of orders for said products specified by said application ID's; and
   notifying the provider of said products for which the order specified by said application ID's has been cancelled, according to a result of said judging.

7. A delivery management device that manages delivery of ordered products, comprising:
- accepting means for accepting applications for delivery of said products;
- assigning means for assigning application ID's to said applications;
- prompting means for prompting a recipient to designate delivery terms by notifying a delivery recipient of said application ID's;
- providing means for providing to said delivery recipient with a list of the products scheduled to be delivered to said delivery recipient and said application ID's therefore;
- a term accepting means for accepting from said delivery recipient designation of delivery terms for the applications specified by said application ID's after orders of said products; and
- requesting means for requesting delivery by notifying a delivery business of the products corresponding to application ID's for which the same delivery term has been designated, the designated delivery terms, and the delivery recipient;
- wherein the delivery terms comprise a date and time of delivery.

8. A computer-readable recording medium on which is recorded a program for executing the delivery information service method used in a delivery information service device wherein a plurality of user terminals, a plurality of delivery business terminals and a plurality of vendor terminals are interconnected over a network, said program operative to cause a computer to execute:
- receiving product delivery request information sent from a vendor terminal or user terminal, wherein said delivery request information includes a recipient of said products and whether delivery of said products has been made;
- storing said delivery request information in a delivery request information unit;
- extracting said delivery request information from said delivery request information storage unit, wherein extracted delivery request information is for deliveries that have not yet been made and the delivery recipient being the same as the delivery recipient included in said delivery request information received;
- acquiring a notification address of said delivery recipient from a correspondence table of notification addresses that are held having been matched beforehand with delivery recipients, in order to send notification to the notification address of said delivery recipient of said received delivery request information, of said extracted delivery-pending delivery request information, and of information prompting the input of desired delivery terms; and
- transmitting to a delivery business terminal of information giving instruction for delivery of the article for delivery to said delivery recipient in accordance with the desired delivery terms sent from said delivery recipient;
- wherein the delivery terms comprise a date and time of delivery.

9. A delivery information service method comprising:
- receiving a delivery request for an article;
- storing the received delivery request in a storage device;
- searching said storage device and delivery requests for pending deliveries with the same delivery recipient as the delivery recipient of said delivery request are extracted;
- referring to an address table wherein delivery recipients and notification addresses have been matched beforehand and the notification address of the delivery recipient is extracted;
- giving notification to the delivery recipient notification address of said delivery request and of said extracted delivery-pending delivery request and prompting the recipient to input desired delivery terms; and
- based on the desired delivery terms given in response, making instructions for delivery to said delivery recipient of the article scheduled for delivery, said instructions being given to a delivery business that has been designated by the desired conditions or that matches said desired conditions;
- wherein the delivery terms comprise a date and time of delivery.

* * * * *